F. EVANS.
HEADLIGHT FOR BICYCLES, MAGNETIC DRIVE.
APPLICATION FILED JUNE 26, 1920.

1,411,617.

Patented Apr. 4, 1922.

Inventor
Fred Evans
By his Attorney Fredk C. Fischer.

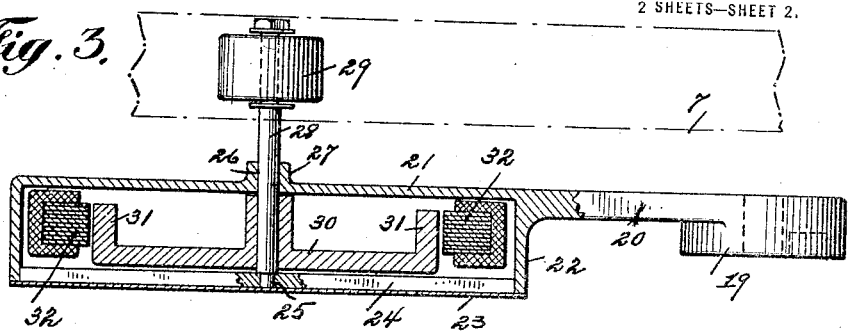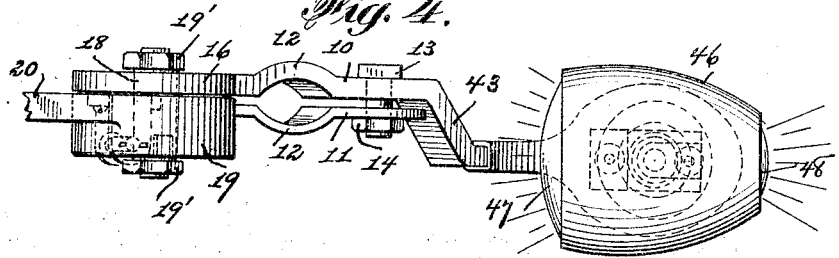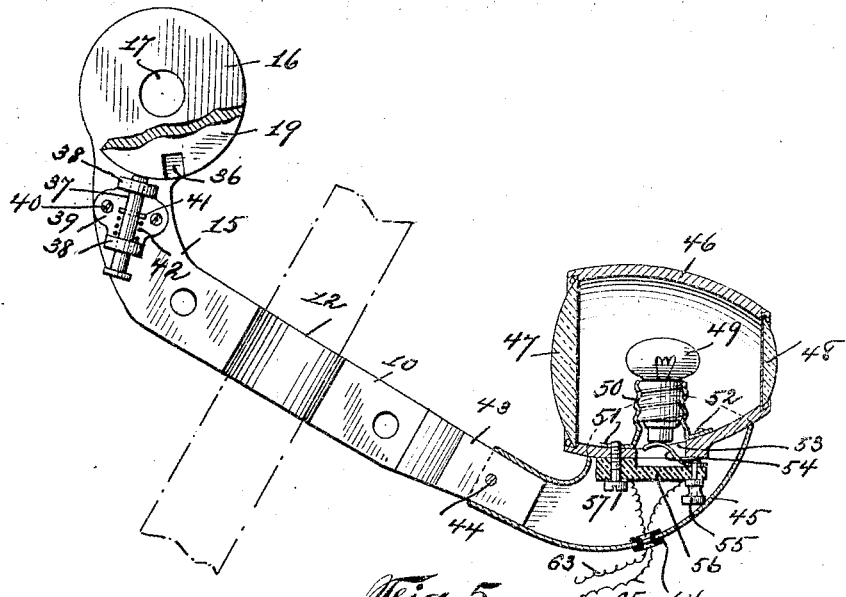

UNITED STATES PATENT OFFICE.

FRED EVANS, OF SUMMIT, NEW JERSEY, ASSIGNOR TO LOUIS V. ARONSON, OF NEWARK, NEW JERSEY.

HEADLIGHT FOR BICYCLES, MAGNETIC DRIVE.

1,411,617.                      Specification of Letters Patent.       Patented Apr. 4, 1922.

Application filed June 26, 1920. Serial No. 392,024.

*To all whom it may concern:*

Be it known that I, FRED EVANS, a citizen of the United States, residing in the city of Summit, in the county of Union and State of New Jersey, have invented certain new and useful Improvements in Headlights for Bicycles, Magnetic Drive, of which the following is a full, clear, and exact description, such as will enable others skilled in the art to which it pertains to make, construct, and use the same, reference being had to the accompanying drawings, and to numerals of reference marked thereon, forming a part of this specification.

An object of the present invention is to provide a novel bracket for use in connection with bicycles, motorcycles and the like, for the support thereon of a magneto in position to be operated directly from a ground wheel, and for the support also of a combined head and tail-lamp, embodying an incandescent lamp, which is connected in circuit with the magneto so that the incandescent lamp may be caused to glow whenever the magneto is operated.

Another object of the invention is to provide means whereby to maintain the magneto either in or out of operative relation with respect to the ground wheel.

The invention also aims to provide a combination of the character specified, which shall be of simple and economical construction and which shall be facile and efficient of operation and of great durability.

In the accompanying drawings, wherein I illustrate the preferred form of my present invention,—

Figure 3 is a top plan view, showing the magneto in section, taken on the line 3—3 of Figure 2.

Figure 4 is a top plan view of the device with the magneto unit broken away.

Figure 5 is a side elevation and section of the parts shown in Figure 4.

Figure 1:
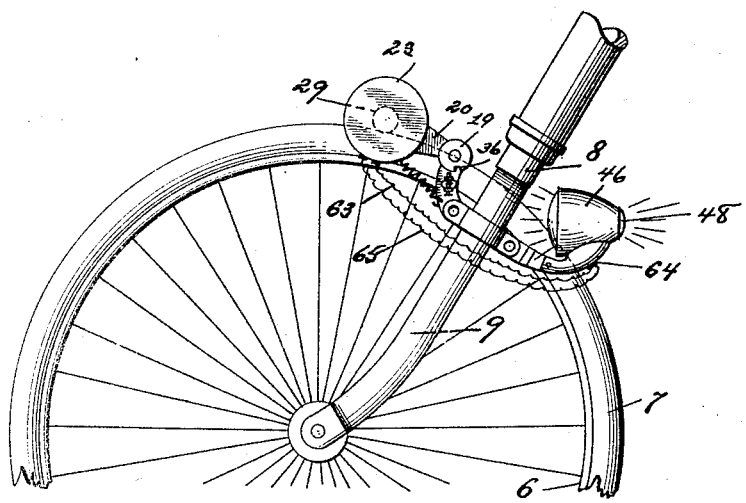
Figure 1 is a view in side elevation of my improved device as applied to a bicycle, fractionally shown.

The parts of a bicycle shown in Fig. 1 of the drawings comprise a ground wheel 6, equipped with a pneumatic tire 7, and a steering fork 8 whose arms 9 straddle the wheel in the usual way.

10 and 11 represent, respectively, a bracket and a clamping element, each cast between its ends, as best shown in Fig. 4, with an outwardly bowed region 12, designed to embrace an arm 9 of the steering fork, and these parts, on opposite sides of the bowed regions 12, are bound together by means of the bolt and nut structures 13 and 14. The forward portion of the bracket 10 is made with an upward curve 15 which merges into a disk-shaped head 16, provided with a central aperture 17.

18 is a pin which extends through the aperture 17, and on which is mounted for turning movement a disk-shaped head 19. These parts are held in proper operative relation by the nuts 19', threadedly applied to the opposite ends of the pin 18. The disk shaped head 19 is cast with a web 20, made integral with a cast drum-shaped magneto shell consisting of a circular side plate 21 and a projecting peripheral flange 22. The open side of this casing is closed by a circular plate 23, to the inner side of which, diametrically thereacross, is secured a bar 24 of a length to fit inside the flange 22. This die plate 23 may be secured to the flange 22 by screws or other suitable means. Journaled for rotation at 25 in the bar 24 and at 26 in an exterior boss 27, formed centrally for the purpose on the side plate 21, is a shaft 28 which projects over the pneumatic tire 7 and to which is made fast a roller 29 in position to have frictional engagement with the tread of said tire.

Made fast to the shaft 28 within the casing is a permanent magnet 30, formed with a plurality of branches 31, which work between a corresponding number of cores 32, coil wound in series to form an armature, and supported on a ring 33 which is secured to the inner face of the side plate 21. Under this arrangement, the rotation of the ground wheel 6 will spin the magnet between the armature cores so as to set up a current in the coils thereof, in a manner that will be well understood; and in order to maintain the roller in proper operative engagement with the tire when a current is desired, I preferably employ a coiled spring 34 which is connected between an eye-screw 35, attached to the flange 22 below the web 20, and the adjacent upwardly curved part 15 of the bracket. This spring not only draws the casing downwardly to keep the roller in proper frictional engagement with the tire, but it yields to permit upward movement of the casing in response to the turning of the roller on any mud or foreign substance that may adhere to the tire.

One feature of the invention consists in the provision of means for locking the casing in elevated position against the action of the spring and with the roller wholly disengaged from the tire. In carrying out this feature, I provide in the circumference of the disk-shaped head 19 an opening 36, receptive of the end of a plunger 37, operatively held in the lugs 38 of a bracket 39 which is attached by means of screws 40 to the curved part 15 of the bracket (Fig. 5). Coiled around this plunger and confined between a collar 41 thereon and the lower lug 38, is a spring 42, which urges the plunger into upward position with the top end thereof bearing on the circumference of the head 19, so that when the casing is elevated sufficiently to remove the roller from the tire, the plunger will enter the opening 36, thereby locking the casing in such elevated position.

The opposite or rear end of the bracket 10 is cast with an outwardly offset portion 43, to which is pinned at 44 a hollow horn-shaped support 45, on the open end of which is secured a cylindrical longitudinally curved lamp casing 46. In the forward or larger end of this casing is set a head-light lens 47, and in the rear or smaller end thereof, is set a tail-light lens 48, preferably colored red. 49 is an incandescent lamp whose base is threaded into a tubular socket 50, flanged at 51 so as to be secured by means of rivets 52 to the inner side of the casing 46 and around an opening 53 cut therein, to permit a conducting spring 54 to engage the terminal of the lamp. Said conducting spring is held by a binding post 55, attached to a plate of insulating material 56, which is secured by a binding or conducting screw 57 to the outer face of the casing 46 within the base 45. This screw 57 is also threaded into the flange 51 of the socket.

Figure 2:
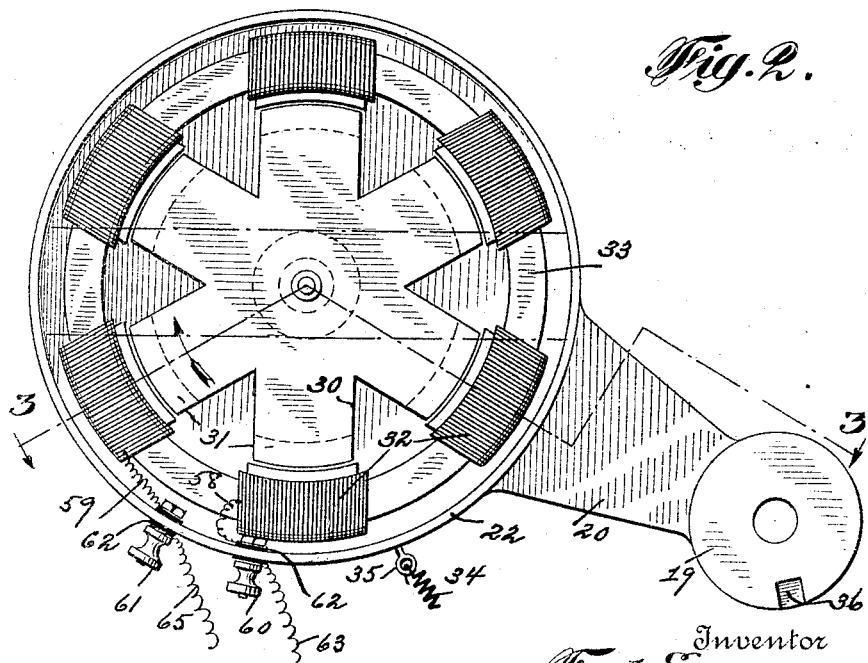
Figure 2 is an enlarged side elevation of the magneto, shown as a unit with a part of the casing removed.

The opposite ends 58 and 59 (Fig. 2) of the armature winding are engaged with binding posts 60 and 61, respectively, arranged in the magneto casing flange 22 but insulated therefrom by the inset eyelet devices 62. From the binding post 60, a conducting wire 63 leads through an insulating eyelet 64, provided in the support 45, and thence connects with the binding post 55, whence the current passes through the spring 54 to the lamp. The return is accomplished through the lamp base, socket 50, binding screw 57, and return wire 65, which leads through the eyelet 64 and connects with the binding post 61.

From the foregoing description, taken in connection with the drawings, it will be seen that I provide simple and efficient means by which to hold the magneto either in or out of operative relation with respect to the ground wheel, that by means of the magneto, during the travel of the bicycle, current may be produced to provide a continuous head and tail-light when desired, and that due to the form of the bracket, the lamp is so held in offset relation that the rays cast therefrom both front and rear have an unobstructed path.

Experience has demonstrated that the organization above described is a highly efficient one, and while I have shown the preferred embodiment of my present invention, I do not wish to be limited to the exact details of construction shown and described, as obvious modifications thereof, not involving the exercise of invention, may be made by any skilled mechanic, and such departures from what is herein set forth, I consider within the scope and terms of my claims.

Having thus described my invention, what I claim is:—

1. In a self-contained lighting unit for bicycles and the like, an elongated bracket having means for being clamped on a frame part in relation to a ground wheel and having a disk-shaped head, a magneto casing having a projecting portion provided with an opening in pivotal engagement with said head, a magneto operatively disposed in the casing and having an operating shaft projecting therefrom and provided with a friction element adapted to make contact with the ground wheel to receive motion therefrom, a spring connecting the casing projection with the bracket for yieldingly maintaining the casing in position to hold the friction element in contact with the ground wheel, and a spring-urged plunger in connection with said projection and attached to said bracket for locking the casing in position whereat the friction element is rigidly maintained out of engagement with such ground wheel.

2. The combination with an elongated bracket having a head end and an offset end, of a magneto casing having a projecting portion pivotally engaged with said headed end, said projecting portion provided with an opening, a magneto operatively disposed in the casing and having an operating shaft projecting therefrom and provided with a friction element adapted to make contact with a rotary element, a spring connecting the casing projection with the bracket for drawing the casing into position to effect such contact, a spring-urged plunger attached to said bracket and adapted to enter the opening in said projecting portion for locking the casing rigidly with the bracket against the action of the spring, a head and tail light casing supported on said offset bracket end and provided with an incandescent lamp, and circuit connections between said magneto and said incandescent lamp whereby to cause the latter to glow when the former is operated.

This specification signed and witnessed this 15th day of June, 1920.

FRED EVANS.

Witnesses:
FRED'K C. FISCHER,
F. NOLL.